C. F. CRAIG AND H. M. CONNOR.
PLAYING BALL.
APPLICATION FILED DEC. 8, 1919.

1,399,293.

Patented Dec. 6, 1921.

Inventors
C. F. Craig, and
H. M. Connor, by
T. A. Witherspoon
Attorney

UNITED STATES PATENT OFFICE.

CHARLES F. CRAIG AND HERSCHEL M. CONNOR, OF SAN FRANCISCO, CALIFORNIA, ASSIGNORS TO CRAIG GOLFMETER CO., A CORPORATION OF DELAWARE.

PLAYING-BALL.

1,399,293.  Specification of Letters Patent.  Patented Dec. 6, 1921.

Application filed December 8, 1919. Serial No. 343,364.

*To all whom it may concern:*

Be it known that we, CHARLES F. CRAIG and HERSCHEL M. CONNOR, both citizens of the United States, residing at San Francisco, in the county of San Francisco and State of California, have invented certain new and useful Improvements in Playing-Balls; and we do hereby declare the following to be a full, clear, and exact description of the invention, such as will enable others skilled in the art to which it appertains to make and use the same.

This invention relates to playing balls and has for its object to provide means whereby the same may be attached to practice or other captive ball devices in a manner more simple and efficient than those heretofore proposed.

With this and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1:
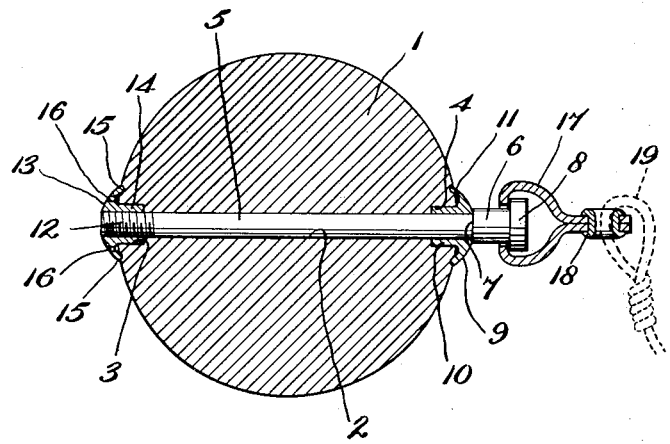
Figure 2:
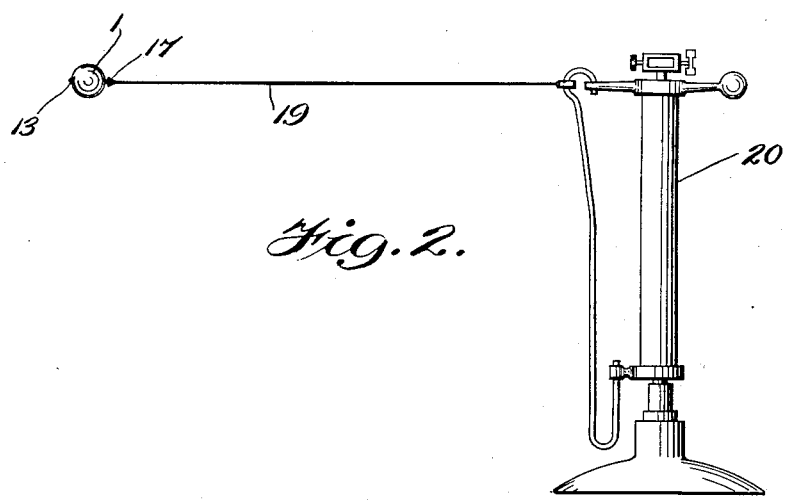

Figure 1 is a central vertical sectional view of a device made in accordance with the present invention; and Fig. 2 is a diagrammatic elevational view showing a ball connected to one form of practice device.

1 indicates a playing ball, such for example as a golf ball, provided with a diametrical bore 2, enlarged at its ends 3 and 4, as shown, through which passes the body portion of a pin 5. The said pin is provided with an enlarged portion 6 forming a shoulder 7, and also with a head 8, as will be clear from Fig. 1.

Mounted upon the pin 5 adjacent the shoulder 7 is a washer member 9, having a hub 10 which fits into the recess 4, and the said washer member 9 is also provided with an annular flange 11 adapted to bite into the surface of the ball 1 as will be readily apparent. The extreme end of the pin 5 is threaded as at 12, and is engaged by the nut 13, provided with the hub 14 and annular flange 15, similar to the hub 10, and flange 11 of the washer 9. The said nut 13 may also be provided with a plurality of holes or recesses 16 to accommodate a suitable spanner wrench.

17 indicates a swivel connection provided with an eyelet 18 adapted to receive a cord, wire or other flexible connection 19.

In the use of practice devices, such as the captive ball device 20, shown in Fig. 2, for practising the game of golf, much trouble has been encountered in securely attaching the balls to the mechanisms. Further, in many of the devices heretofore proposed, the balls have shown a tendency, after a few strokes, to lose their true spherical shape, becoming oval or egg shaped. We have found however, that by employing a connection such as that above disclosed, the balls may not only be securely fastened to the connection such as 19, but also owing to the support afforded by the cupped washer 9 and nut 13, that the said balls retain their original shape for a much longer period of time. Further, should the ball become slightly out of true, it may be often restored to perfect condition by merely tightening up on the nut 13, thereby compressing the ball somewhat, while if it is desired to substitute a new ball, it is a simple matter to remove the nut 13, whereupon the old ball may be readily slipped off the pin 5, a fresh one substituted, and the nut replaced.

It is obvious that those skilled in the art may vary the details of construction without departing from the spirit of the invention, and therefore, we do not wish to be limited to the above disclosure except as may be required by the claims.

What we claim is:—

1. In a device of the class described the combination of a ball provided with a diametrical bore; a pin provided with a shoulder passing through said bore; a washer member carried by said pin and coacting with said shoulder, said member being provided with a flange adapted to bite into the surface of said ball and support the same; and a nut adapted to prevent the withdrawal of said pin, substantially as described.

2. In a device of the class described the combination of a ball provided with a diametrical bore; a headed pin provided with a shoulder passing through said bore; a washer member carried by said pin and coacting with said shoulder, said member being provided with a flange adapted to bite into the surface of said ball adjacent said bore and to support the same; and a nut threaded to said pin and provided with a flange adapted to bite into the surface of said ball adjacent said bore and to support the same, substantially as described.

In testimony whereof we affix our signatures, in presence of two witnesses.

CHARLES F. CRAIG.
HERSCHEL M. CONNOR.

Witnesses:
MARIE FORMAN,
WM. H. CARR.